United States Patent Office 2,717,264
Patented Sept. 6, 1955

2,717,264

PROCESS FOR DECOMPOSING 1-ALKYLCYCLO-HEXYL HYDROPEROXIDES

Frederick F. Rust, Orinda, and Edward R. Bell, Concord, Calif., assignors to Shell Development Company, Emeryville, Calif., a corporation of Delaware No Drawing. Application July 17, 1951,
Serial No. 237,292

4 Claims. (Cl. 260—488)

This invention relates to a process whereby 1-alkyl-cyclohexyl hydroperoxides are converted into products containing both a hydroxyl and a ketone group.

It is known that various cyclic peroxides can be converted to give a mixture of ketonic and hydroxy-substituted reaction products. Thus, cumene hydroperoxide, when refluxed with acid, yields phenol and acetone. Heretofore, however, it has not been possible to obtain polyfunctional compounds of the type which contain both a hydroxy as well as a ketone group by the decomposition of a cyclic peroxide.

It is our discovery that 1,6-ketols can be obtained in good yield by the acid catalyzed conversion, or cleavage, of cyclohexyl hydroperoxides of the type having the general formula:

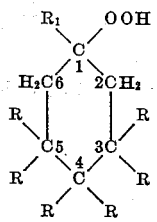

wherein the R's are selected from the group consisting of hydrogen and alkyl radicals, and $R_1$ is an alkyl radical. The reaction of the present invention can be illustrated by the following equation:

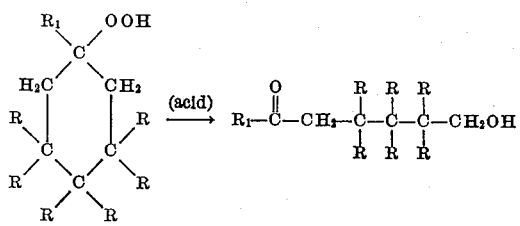

wherein the radicals are as indicated above. In most cases the ketol produced in the foregoing reaction is present at least in part, as the ester of the acid employed as catalyst, the ketol being recovered from the ester by conventional methods, as by hydrolysis or by ester interchange.

Representative cyclohexyl hydroperoxide reactants coming within the scope of the general formula given above, any one of which can be converted to a 1,6-ketol (or ester thereof) in the presence of an acid catalyst, are given in the following table, together with the corresponding products:

TABLE

| Hydroperoxide Reactants | Ketol Products |
|---|---|
| 1-methylcyclohexyl hydroperoxide | 7-hydroxyheptanone-2. |
| 1-ethylcyclohexyl hydroperoxide | 8-hydroxyoctanone-3. |
| 1,3-dimethylcyclohexyl hydroperoxide. | 7-hydroxy-4-methylheptanone-2 and 7-hydroxy-6-methylheptanone-2. |
| 1,4-dimethylcyclohexyl hydroperoxide. | 7-hydroxy-5-methylheptanone-2. |
| 1-methyl-4-tert-butylcyclohexyl hydroperoxide. | 7-hydroxy-5-tert-butylheptanone-2. |
| 1,4,4-trimethylcyclohexyl hydroperoxide. | 7-hydroxy-5,5-dimethylheptanone-2. |
| 1-methyl-4-octylcyclohexy hydroperoxide. | 7-hydroxy-5-octylheptanone-2. |
| 1,3,4,5-tetramethylcyclohexyl peroxide. | 7-hydroxy-4,5,6-trimethylheptanone-2. |

The reaction of the present invention takes place when the acid catalyst is brought into contact with the liquid hydroperoxide, or a solution thereof. The reaction is somewhat exothermic in character and therefore will go forward without external heating even at room temperatures, or lower. In some cases, particularly with the more active catalysts, the amount of heat liberated is so large that it is advisable to cool the reaction mixture so as to control the reaction. However, with the less active acid catalysts, the solution is preferably heated (as by refluxing or the like, though in any event keeping the temperature below about 150° C.) in order to speed the reaction and drive the same towards completion. The proper procedure to be followed in any given case can best be determined by studying the particular hydroperoxide-catalyst system employed, since an acid which is regarded as active with one hydroperoxide may fall into a less active category when employed with a different hydroperoxide. Further, the concentration of the solution plays an important part in this respect, for the more dilute solutions are normally heated in order to obtain high ketol yields, whereas the concentrated solutions containing little, if any, diluent liquids are more strongly exothermic and frequently are cooled so as to control the reaction and prevent excessive by-product formation. Whatever procedure be adopted, appreciable reaction takes place even in periods as short as 5 or 10 minutes, though the preferred practice is to employ reaction periods of from about 20 minutes to as long as 8 or 10 hours or more.

Representative acids are formic acid, acetic acid, and propionic acid.

The desired reaction proceeds at atmospheric, subatmospheric, or superatmospheric pressures. In general, however, atmospheric pressures are employed except when dealing with relatively volatile materials, in which case superatmospheric pressures are preferably used in order to maintain said materials in the liquid state.

The amount of catalyst employed can be varied within relatively wide limits. Good results have been obtained by using from about 0.01 to 1 mole of catalyst for each mole of the hydroperoxide reactant, though a preferred range is from about 0.1 to 0.5 mole of the catalyst.

The hydroperoxide reactant can be employed as such or in the form of a solution of the peroxide in an inert solvent. Suitable solvents include various aliphatic, aromatic and alicyclic hydrocarbons, tertiary alcohols, ethers, ketones and hydrogenated hydrocarbons. In many cases it proves convenient to employ the hydroperoxide in the form of the solution obtained on oxidizing the desired alkylcyclohexane compound to produce the desired hydroperoxide starting material. As is the case with the peroxidic reactant, the acid catalyst can also be employed either per se, or in the form of a water or other solution.

Once the desired reaction mixture is complete, the ketol reaction product can be recovered in any desired manner. The preferred recovery method is to separate the components of the reaction mixture by fractional distillation under reduced pressures. If desired, various solvent extraction processes can also be employed, either alone or in conjunction with the method of fractional distillation. As indicated above, when the ketol is recovered in the ester form, it can be separated therefrom by conventional techniques.

The process of the present invention is illustrated by the following examples:

Example I

In this operation 4.25 parts of an 85% solution of 1-methylcyclohexyl hydroperoxide (the balance being made up substantially of 1-methylcyclohexanol) were refluxed with 25 parts of 87% formic acid for a period of 20 minutes. The resulting reaction mixture was then distilled in vacuo, there being recovered 2.4 parts of the formate ester of 7-hydroxyheptanone-2 as the fraction boiling at 108–9° C. at 7.5–8 mm. Hg. The product 7-hydroxyheptanone-2, recovered from the ester by distillation in vacuo following reflux with methanol, is found to boil at about 120° C. at 9 mm. Hg.

Example II

There were mixed, at room temperature, 10 parts 1-methylcyclohexyl hydroperoxide, 76 parts glacial acetic acid, 11.7 parts p-toluenesulfonic acid and 55.3 parts water. The resulting mixture was heated to 60° C. and maintained at that temperature for 6.25 hours, whereupon it was found that the peroxide was 91% decomposed. After neutralizing the p-toluenesulfonic acid with caustic, the mixture was distilled in vacuo to remove the water and acetic acid. The ketol esters present were then extracted with ether, and the ether solution was distilled in vacuo, yielding, as the fraction boiling at 114–117 (9 mm. Hg) 3.6 parts of product. Of this product, 21% was 7-hydroxyheptanone-2, while 79% represented the acetic acid ester of the free ketol.

Example III

In this operation 29.4 parts of 1-methylcyclohexyl hydroperoxide (96%) was slowly added to 100 parts of 98–100% formic acid. The resulting reaction was strongly exothermic in character, the reaction mixture being cooled with ice to 30° C. It was maintained at this temperature for 35 minutes, when it was found that the hydroperoxide was 94% decomposed. On being distilled in vacuo, there were recovered, as the fraction boiling at 110–111° C. at 10 mm. Hg, 23.7 parts of the formic acid ester of 7-hydroxyheptanone-2. This ester had a refractive index ($n$ 20/D) of 1.4341.

The invention claimed is:

1. A process for producing a ketol formate which comprises contacting a 1-alkylcyclohexyl hydroperoxide having the general formula

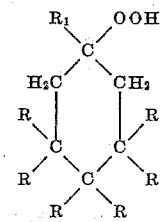

wherein $R_1$ is a lower alkyl radical and the R's are selected from the group consisting of hydrogen and lower alkyl radical with formic acid.

2. The process of claim 1 wherein the hydroperoxide reactant is 1-methylcyclohexyl hydroperoxide.

3. The process of claim 1 wherein about 0.01 to 1 mole of formic acid is used for each mole of 1-alkylcyclohexyl hydroperoxide.

4. The process of claim 1 wherein the reaction is carried out in the liquid phase at a temperature below about 150° C.

References Cited in the file of this patent

UNITED STATES PATENTS

| | | |
|---|---|---|
| 2,522,015 | Barush et al. | Sept. 12, 1950 |
| 2,522,016 | Denison et al. | Sept. 12, 1950 |

FOREIGN PATENTS

| | | |
|---|---|---|
| 983,799 | France | Feb. 14, 1951 |

OTHER REFERENCES

Fieser, Organic Chem. Heath (1944) p. 166.
Hoch, Chem. Ber. 83, 238–44 (1950).